W. W. BURSON.
Grain Binder.
No. 48,900.
Patented July 25, 1865.
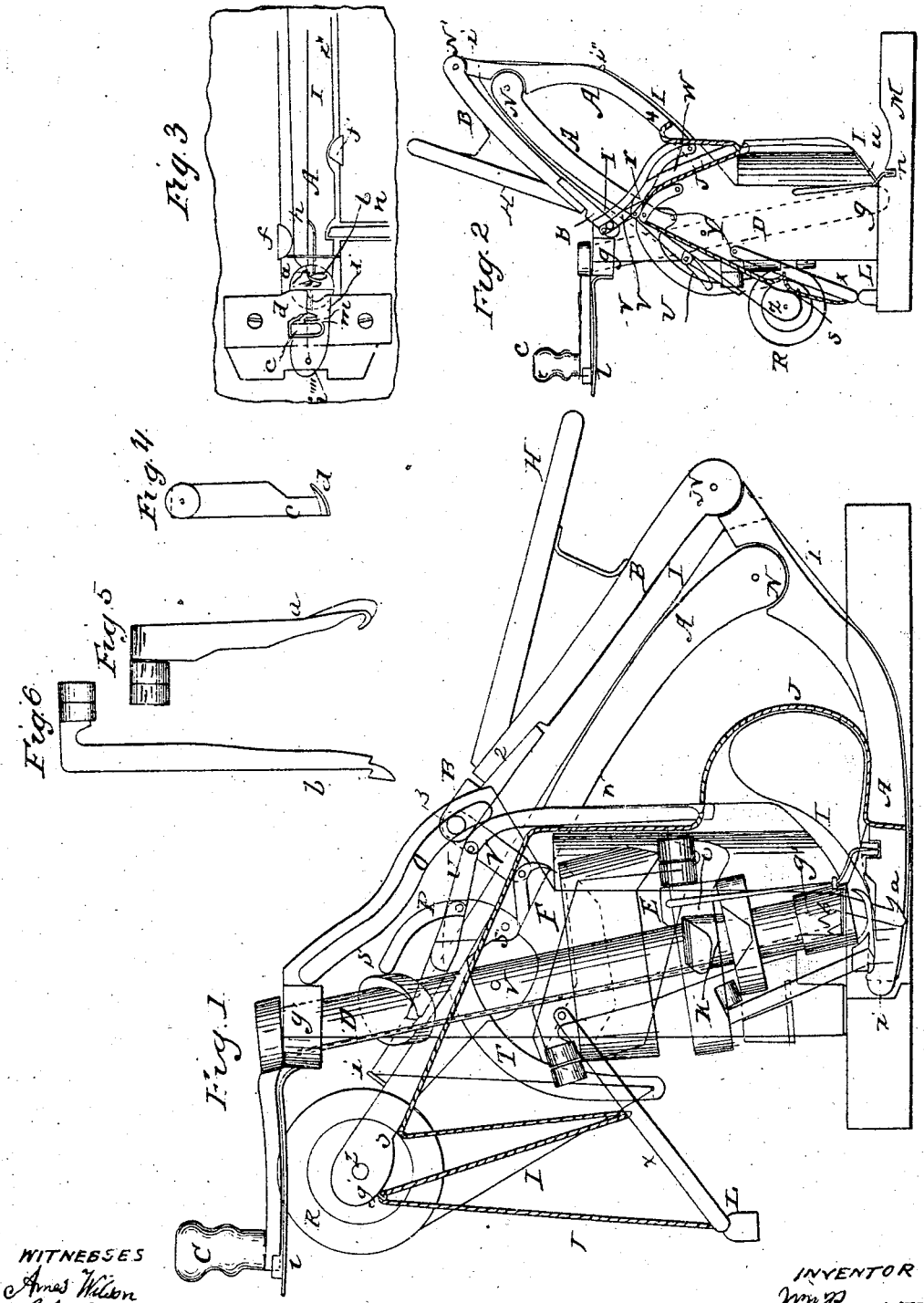

UNITED STATES PATENT OFFICE.

W. W. BURSON, OF ROCKFORD, ILLINOIS.

IMPROVEMENT IN GRAIN-BINDERS.

Specification forming part of Letters Patent No. 48,900, dated July 25, 1865.

*To all whom it may concern:*

Be it known that I, W. W. BURSON, of Rockford, in the county of Winnebago and State of Illinois, have invented a new and useful Machine for Binding Grain upon the Reaping-Machine; and I do hereby declare that the following is a full, clear, and exact description of the same, reference being had to the accompanying drawings, forming a part of this specification, in the several figures of which similar characters of reference denote the same part.

Figure 1 shows a side elevation of the complete machine, the upright Q being removed to show the tying device. Fig. 2 shows the binder with the arm A raised and in proper position to receive the gavel. Fig. 3 shows the tying device, viewed from beneath. Fig. 4 shows hook $c$. Fig. 5 shows hook $a$. Fig. 6 shows hook $d$.

My invention has reference to the binding of grain upon the reaper with cord, twine, or string; and consists of certain combinations of devices, hereinafter to be described.

In the drawing, Fig. 1, M represents the platform which receives the grain preparatory to binding. Upon this platform are supported the uprights Q, which support the arm A and its attachments, pivoted at Y, and also cam-grooves F and E. The shaft D is supported at $g$ and $g'$, and is rotated by turning crank C. Hooks $a$ and $b$ move in grooves made in opposite sides of shaft D. The cam-collars K and S upon said shaft give motion to the hook $c$ and lever U, respectively, by the rotation of said shaft D. The arm A, pivoted at $x$ to uprights Q, is jointed at N to fore-arm A', which latter is jointed at N' to arm-guide B. Arm-guide B has an adjustable splice connection at 2 to B', in which are the trunnions 3, moving in the cam-groove O of uprights Q. Lever V, connecting B' and A, keeps them in proper relative position to each other. The tightening-cord J is secured to fore-arm A' at 4, then passes through eyelet of slide W, through loop 5 of arm A and eyelet 7 of weight-guide X, then through loop 5' of arm A, and is fastened to weight L, which is also secured to the end of weight-guide X. The spool R is secured to the rear end of arm A, and has wound upon it the twine or cord I. Lever T is pivoted to arm A at $s$, and guided in its movements by the stud $r$ moving in groove P of upright Q. Lever U is pivoted at $t$ to arm A, and has its front end jointed to the cord-depresser W, the rear end resting upon the cam-collar S. Lever $o$, pivoted at $u$ to the uprights Q, moves the catch $n$ in the recess made in the platform M.

In operating this binder, it is placed upon the reaper-platform in such position that the grain can be moved from the apron on which it falls to the platform M. The twine or cord I is wound upon the spool R, and the end passed through the hole in the end of lever T, then through loop $i$ on arm A, through eyelet $i'$ in fore-arm A', through loop $i''$ and eyelet $i'''$ of A'; and being drawn through, and the end held in the hand, the handle H is pressed down, bringing the end of the fore-arm A' under the tying device, the crank C being in the spring-catch $l$. The twine is by this movement brought within hook $a$. Lever $o$ is then moved out, bringing the catch $n$ into the notch of fore-arm A', which holds it in its place. When the twine is thus brought within hook $a$, hold the end with one hand, with the other press down the spring-catch $l$, and turn the crank C one revolution slanting to the right hand. This movement should bring the end of the twine within hook $c$, and the end which was being held in the hand should be cut off by the action of the cutting-point $d$ acting upon $d'$ of the receptacle $m$. Now take hold of handle T and raise the arm A; the trunnions 3 of arm-guide B moving in grooves O of uprights Q, guide the point of fore-arm A' by the action of arm-guide B upon the outer end of fore-arm A'. While the arm A is being raised the rear end of lever T is made to approach the spool R by the stud $r$ moving in cam-groove P. This movement of lever T gives out a sufficient length of band material that none is needed to be drawn from the spool R while the arm A is being raised. The arrangement of arm A is such with groove O that the point of A' is folded close to the front shield of the binder, holding the band material nearly perpendicular and out of the way of the gavel, which may be brought endwise or sidewise upon the binding-platform M, without endangering getting the gavel tangled in the band material. When the arm, and consequently the band material, are in the position above described, Fig. 2, the gavel is placed upon the platform M, which may be done with a fork or rake, then handle H is pressed down until the point of fore-arm A' is brought under the tying device, being guided by the trunnions 3 moving in cam-groove O, as just described in raising the arm, and guided sidewise in the opening of the platform M by the projections f' and f, the better to insure the twine being brought in front of hook a. This movement of arm A brings the two ends of the band material around the gavel, also the tightening-cord, the rear end of which, attached to weight L, draws up said weight to accommodate sheaves of different sizes.

This movement of arm A, carrying with it lever T, guided in its motion by stud v moving in groove P, brings down rear end of said lever, drawing the band tightly around the gavel, the tension of the band being regulated by compression put upon the spool R by means of the screw and friction-pad Z, holding said spool upon the rear end of arm A. This movement of lever T should draw off sufficient length of band material to enable the arm A to be raised without drawing more from spool R. The movements just described should bring the two ends of the band within hook a. Press down spring-catch b so as to release crank C, which turn to the right one revolution, which rotates shaft D, whereby hook a is drawn up, following the direction given by cam-groove E; and when about one-half the revolution is made, hook b, following the direction of cam-groove F, is driven down through the loop formed on hook a, shoving the loop from the back part of said hook, Fig. 3, and awaits the movement of hook c, which at about three-fourths of the revolution is driven down by entering cam groove K on shaft D, which releases the severed end of the twine I, held by it, and, passing below the twine stretched above the point of A', is drawn up by the continued rotation of shaft D, when the cutting-point d, coming against the cutting-edge d' of receptacle-plate m, severs the spool portion of the band from the sheaf portion. The hook c securely holds the severed end of the band material by pressing against the receptacle-plate m, while hook b draws the severed ends through the loop held by hook a, which is then driven down by the cam in grooves E, releasing the knot, which is drawn off by the removal of the sheaf when the arm A is partly up, the latch n being first drawn back.

In the operations just described particular attention is directed to the following points:

First, the arrangement and combination of the jointed arm A with the groove O of the upright Q, whereby the arm is folded in such manner as to hold the band material I perpendicular and out of the way of the gavel while being brought upon the binding-platform M. This disposal of the band material I is found to be of great advantage in allowing the gavel to be brought up in good order for binding, and avoiding the difficulty heretofore experienced in permitting a part of the grain to get back of the band material I, and consequently such portion would not be bound in the sheaf, but would be scattered over the field.

Second, the band-controlling lever T, pivoted to the arm A, and moved by it, has its lower end guided by the stud r, moving in groove P. This lever is so arranged as to draw out sufficient length of band material from the spool R, not only to draw the band tightly around the gavel, but also to enable the arm A to be raised without drawing from the spool R. This arrangement of arm A, lever T, groove P, and spool R, enables the proper tension to be put on the band by simply regulating the pressure put upon the spool by means of the screw Z, presenting the advantage of drawing the band tightly around the gavel, and at the same time drawing sufficient length of twine from the spool, so that no more shall be needed in raising the arm, which does not add to the labor of putting the arm down, and saves that amount of labor in raising it. This lever T also presents the advantage of allowing the band material to slacken while the fastening is being made—an important matter when wire is used for binding. This is done by making a recess in the outer wall of groove P, into which stud r may fall when the arm is fully down, allowing the lower end of lever T to rise a little, which movement may be conveniently increased by a "fly" for stud r to pass over, instead of the recess above described.

Third, the hook a, in forming the loop, must draw sufficient length of twine from the sheaf portion, or that surrounding the sheaf, to form such loop, which brings a strain upon the band material, liable to break it when drawn tightly around the gavel. To obviate this difficulty, lever U is pivoted upon the arm A, the rear end resting upon the cam-collar S of shaft D, and the front end is attached to the upper end of cord-depresser W, through the lower end of which passes the tightening-cord J. Now, the rotation of shaft D raises the rear end of lever U by means of the cam-collar S, thereby depressing the cord J, compressing the gavel, and saving the strain upon the band material heretofore referred to. Instead of the increased compression of the gavel just described, the necessary length of twine to form the loop could be obtained by making the cutting and holding device, hook c, plate m, &c., movable, and arranged to approach the shaft D while the loop was being formed, which could be easily done by means of a cam upon shaft D, or it might be held out against a given amount of strain by a spring which would yield when the strain was increased beyond that amount. Still another plan to give such length would be to make the holding-surface of the hook $c$ broad, so as to hold a greater length of end of twine, and allowing it to be drawn out by the rotation of hook $a$. Either of these plans would obviate the too great strain upon the twine in forming the loop. Still an increased compression upon the gavel while the loop is being formed is deemed the best.

Fourth, the primary object of hook $a$ is to form the loop through which hook $b$ may draw the severed ends of the twine to form a perfect knot. This loop may be formed by a hook on the foot of shaft D; but, since the twine must be lower than the point of such hook, it is difficult to get the twine upon such hook. The loop may also be formed by pincher-jaws on the foot of said shaft, conveniently closed by rotating them within a cam-circle. The greater length of twine required to form the loop, and greater hinderance to the passage of the twine under them, with greater exactness of mechanism, than by the employment of hook $a$, are the objections to the use of pinchers in forming the loop. It will be noticed that the hook $a$ is moved forward as it is raised, to add to the certainty of securing the hold upon the twine, and when the revolution is about one-half made the hook is raised still higher, which brings the twine against sides of the groove in which hook $a$ moves, which may be constructed to hold it with any degree of tightness, giving in this respect all the advantage of pinchers for that purpose, while its being thus drawn up allows the twine to pass freely under it—both very desirable considerations. When hook $b$ has drawn the severed ends of the twine through the loop, hook $a$ is driven down, slipping off the now perfect knot, and being in a convenient place to receive the twine for the next band.

Fifth, hook $a$, being placed eccentric upon shaft D, by its rotation brings the twine into the notch or recess of receptacle $m$, and the further rotation of the shaft D brings the twine against the belaying-point $h$ on the foot of shaft D, Fig. 3. This belaying-point, in connection with the notch or recess in the receptacle-plate $m$, prevents the severed ends from being drawn out beyond the reach of hook $b$, rendering a certainty of tying a perfect knot.

Sixth, the projections $f'$ and $f$ in the opening of the platform M, by throwing the end of A' sidewise, assist in securing the proper bringing of the band-material in hook $a$.

Seventh, the object of catch $n$ is to securely hold down the end of arm A' while the knot is being tied, as it would interfere with the operation of tying the knot if the arm is allowed to move back before the knot is tied. Instead of the lever $o$ to move the catch $n$, said catch could be moved by a spring or weighted lever by well-known mechanical devices, the object aimed at being the same—to hold down the arm A' while the knot is being tied.

Eighth, the tightening-cord J is passed through the eyelet of lever X, so that a greater length of said cord may be taken up and given out by the movement of the rear end of lever A than if passed through a single loop and then fastened to weight L. This arrangement brings cord J more effectively around a small sheaf, and at the same time gives more length of cord in raising arm A to enable the sheaf to be removed. Instead of passing through the eyelet in lever X, the cord J may be passed through an eyelet or staple permanently secured to the binder foundation. In either case substantially the same results would be obtained.

Having thus described my invention, what I desire to claim as my invention is—

1. The arrangement of the jointed arm A with the groove O to hold the band material perpendicular and out of the way of the gavel, substantially as described, and for the purposes set forth.

2. The combination and arrangement of lever T with cam-grooves P and spool R, substantially as described, and for the purpose set forth.

3. The combination of lever U, cam-collar S, and pitman W with tightening-cord J, substantially as described, and operating for the purpose set forth.

4. The combination of hook $a$ with shaft D and groove E, constructed substantially as described, and operating for the purpose set forth.

5. The combination of hooks $a$ and $b$, constructed and operating substantially as described.

6. The combination of hook $c$, provided with the cutting-point $d'$, with the receptacle-plate $m$, having the cutting-edge $d'$, operating substantially as described, and for the purpose set forth.

7. The combination and arrangement of the belaying-point $h$ and recess of receptacle-plate $m$ with hooks $a$ and $b$, operating for the purpose set forth.

8. The projecting blocks $f'$ and $f$ on alternate sides of the opening in the platform M, operating for the purpose set forth.

9. The combination of latch $n$, lever $o$, and fore-arm A', constructed substantially as described, and operating for the purpose set forth.

W. W. BURSON.

Witnesses:
CYRUS F. MILLER,
WHIPPLE JILSON.